(12) United States Patent
Wang et al.

(10) Patent No.: US 9,306,853 B2
(45) Date of Patent: Apr. 5, 2016

(54) MAINTAINING QUALITY OF SERVICE FOR MULTI-MEDIA PACKET DATA SERVICES IN A TRANSPORT NETWORK

(75) Inventors: Xin Wang, Parsippany, NJ (US); Yang Yang, Parsippany, NJ (US); Lily H. Zhu, Parisppany, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1016 days.

(21) Appl. No.: 11/428,964

(22) Filed: Jul. 6, 2006

(65) Prior Publication Data
US 2008/0008093 A1    Jan. 10, 2008

(51) Int. Cl.
*H04L 12/28* (2006.01)
*H04L 12/801* (2013.01)
*H04L 12/851* (2013.01)
*H04L 12/823* (2013.01)

(52) U.S. Cl.
CPC ............... *H04L 47/10* (2013.01); *H04L 47/11* (2013.01); *H04L 47/12* (2013.01); *H04L 47/14* (2013.01); *H04L 47/24* (2013.01); *H04L 47/32* (2013.01)

(58) Field of Classification Search
USPC .......................................................... 370/229
See application file for complete search history.

(56) References Cited

U.S. PATENT DOCUMENTS

| | | | | |
|---|---|---|---|---|
| 6,201,793 | B1 * | 3/2001 | Chen et al. ..................... | 370/238 |
| 7,385,920 | B2 * | 6/2008 | Zhang et al. ................... | 370/229 |
| 2002/0124103 | A1 * | 9/2002 | Maruyama .............. | H04L 47/10 709/234 |
| 2005/0147041 | A1 * | 7/2005 | Zaki et al. ..................... | 370/235 |
| 2005/0195740 | A1 * | 9/2005 | Kwon ........................... | 370/229 |
| 2005/0238090 | A1 * | 10/2005 | Ooghe ................ | H04M 11/062 375/222 |
| 2006/0109786 | A1 * | 5/2006 | Abdel-Kader .... | H04L 29/06027 370/232 |
| 2006/0227708 | A1 * | 10/2006 | Tan et al. ....................... | 370/235 |
| 2006/0251011 | A1 * | 11/2006 | Ramakrishnan et al. ..... | 370/328 |
| 2007/0177510 | A1 * | 8/2007 | Natarajan ............. | H04W 36/22 370/238 |

(Continued)

FOREIGN PATENT DOCUMENTS

EP    0932282 A2    7/1999    .............. H04L 12/56

OTHER PUBLICATIONS

International Search Report and Written Opinion mailed Jan. 31, 2008.

(Continued)

*Primary Examiner* — Nicholas Sloms
(74) *Attorney, Agent, or Firm* — Davidson Sheehan LLP

(57) ABSTRACT

A method and an apparatus for maintaining a quality of service (QoS) for a multi-media packet data service in a transport network is provided. The method comprises determining a first packet loss indication for a first flow of QoS traffic packets. The method further comprises determining a second packet loss indication for a second flow of QoS traffic packets, wherein the determination of the first packet loss indication for the first flow of QoS traffic packets is independent from the determination of the second packet loss indication for the second flow of QoS traffic packets. The method further comprises determining whether to drop the first flow of QoS traffic packets based on the first packet loss indication or to drop the second flow of QoS traffic packets based on the second packet loss indication. By using per-flow independent packet loss statistics to determine whether that flow should be dropped and gradually dropping such QoS flows having the most impact on a desired QoS performance, a reduced number of QoS flows may be dropped to recover a data transport network from congestion.

14 Claims, 3 Drawing Sheets

(56) References Cited

U.S. PATENT DOCUMENTS

2007/0280277 A1* 12/2007 Lund .................. H04L 49/205
370/412
2008/0253314 A1* 10/2008 Stephenson et al. .......... 370/326

OTHER PUBLICATIONS

XP-002462717—Database Inspection [On-Line]—The Institution of Electrical Engineers, Stevenage, GB; Oct. 2004, An Zhiping et al., "Real-Time Enhanced Random Early Detection Algorithm for Multimedia Service"; Database Accession No. 8367606 Abstract & Journal of Xi' an Jiaotong University Editorial Board J. of Xi' an Jiaotong University China, vol. 38, No. 10, Oct. 2004, pp. 1061-1064, ISSN: 0253-987x.

XP-019214488—Jenny J He et al., "Flow Routing and Its Performance Analysis in Optical IP Networks", Photonic Network Communications, Kluwer Academic Publishers, Bo, vol. 3, No. 1-2, Jan. 2001, pp. 49-62, ISSN: 1572-8188 p. 54 right-hand column.

Maurizio Cason!, "Performance of TCP Over Differentiated Services Networks with ATM Switching Systems", Globecom'02, IEEE Global Communications Conference, Nov. 17, 2002, 6 pages.

Hector Velayos et al., "Overload Protection for IEEE 802.11 Cells", IWQOS 2006, 14th IEEE International Workshop on Quality of Service, Jun. 1, 2006, 10 pages.

He et al., Flow Routing and its Performance Analysis in Optical IP Networks, *Photonic Network Communications*, 3:1/2 49-62-2001, 2001 Kluwer Academic Publishers Manufactured in the Netherlands, pp. 5-22.

* cited by examiner

MAINTAINING QUALITY OF SERVICE FOR MULTI-MEDIA PACKET DATA SERVICES IN A TRANSPORT NETWORK

1. FIELD OF THE INVENTION

This invention relates generally to telecommunications, and more particularly, to wireless communications.

2. DESCRIPTION OF THE RELATED ART

Wireless communications systems or mobile telecommunication systems typically provide different types of services to different users or subscribers of wireless communication devices. The wireless communication devices may be mobile or fixed units and situated within a geographic region across one or more wireless networks. The users or subscribers of wireless units or communication devices, such as mobile stations (MSs) or access terminals or user equipment may constantly move within (and outside) particular wireless networks.

A wireless communications system generally includes one or more base stations (BSs) that can establish wireless communications links with wireless units. Each wireless unit has an active set, which comprises a set of base stations with which it may communicate. Base stations may also be referred to as node-Bs or access networks. To form the wireless communications link between a wireless unit and a base station, the wireless unit accesses a list of available channels (or carriers) broadcast by the base station.

Wireless services, such as packet data services, especially end-to-end packet data services, including multi-media applications are becoming popular among technology savvy consumers. Despite advances in computing and networking, transporting network traffic generally depends upon real-time network performance for many packet data services. Typically, a data network is deployed to transport network traffic associated with a variety of packet data services, such as voice and video services involving interaction from users. However, an increasing number of packet data services, and other services, impose user demands on the data network usage for transportation of service traffic. These user demands, such as Quality of Service (QoS) requirements, may be expressed in terms of throughput and end-to-end delay.

For the purposes of providing such packet data services, including multi-media applications, in a wireless network (or even in a wireline network), a base station that provides network access support on a Radio Access Network (RAN) is typically connected to other network components via backhaul facilities, such as a T1 line, E1 line or Ethernet. A Radio Access Network generally manages radio access resources including a forward link (FL) radio frequency (RF) resource, a reverse link (RL) RF resource, and resources of a backhaul transport network. However, a successful provision for a desired Quality of Service (QoS) support of an end-to-end packet data service or a multi-media application in the RAN may primarily depend upon the quality and reliability of the backhaul transport network due to the additional cost on the backhaul transport network. For example, bottlenecks/congestions associated with the backhaul resources may adversely affect QoS of a service, especially for the real-time applications having a relatively tight delay and jitter requirements.

To support different QoS requirements of different applications, a transport QoS strategy is often employed to map the application-level QoS into transport QoS classes. One approach on transport QoS uses an Internet Protocol (IP)-based QoS scheme, such as a QoS protocol referred to as Differentiated Services (DiffServ) to guarantee differential treatment of packets with various QoS on the Internet. By using DiffServ, different providers may achieve different levels of service to different users of the Internet and/or prioritize IP voice and data traffic (for example, to preserve voice quality) during heavy network traffic. For example, an Internet Engineering Task Force (IETF) standard based DiffServ operates at Layer 3 and allows out-of-band negotiation for flows that are aggregated in a network. In particular, Differentiated Services Code Points (DSCPs) may be assigned to different QoS flows to give router indication of the priorities of different QoS flows and hence derive the appropriate per-hop-behavior. Generally a Differentiated Services Code Point is an integer value encoded in a Type OF Service (TOS) field of an IP datagram to provide traffic marking since its value corresponds with a preferred QoS as a packet traverses a network. That is, a DSCP value corresponds to a specific QoS.

Meanwhile, to ensure the QoS performance of the applications over the backhaul transport network, sufficient resource needs to be in place to accommodate the injected traffic. To this end, one approach employs a call/flow admission control mechanism to constrain the number of total admitted QoS flows based on available backhaul resource. Even with all above QoS schemes in place, there is still real likelihood for the backhaul transport network to run into congestion. Reasons for congestion may include, but are not limited to:

1. Facility or network component impairments or failures that cause the backhaul resource shortage.
2. Traffic burstiness that is not absorbed totally by call admission and QoS scheduling, causing temporary facility overload. This is especially true for wireless backhaul facilities, which are often expensive in practice and hence rarely over-provisioned.

When a facility is congested, packets are delayed or dropped depending on the implementation of the transport component along the path. If congestion sustains, most traffic carried on the facility are impacted and the application performance can be severely degraded. That is, when transport congestion happens in a data transport network it becomes difficult to maintain an optimal overall performance for the aggregate QoS traffic.

In one QoS system, the transport network congestion is detected via aggregate traffic performance measurement, such as aggregate traffic packet loss rate. This approach has several draw-backs including:

1. With different QoS per-hop-behavior configurations in the transport nodes along the transport path, it is difficult or even infeasible to derive a particular QoS class traffic performance from the aggregate packet loss.
2. By measuring only the aggregate traffic performance metric, it is difficult or even impossible to optionally select the portion of the traffic that need to be dropped and can make an impact to the backhaul congestion status.

Therefore, it is even more difficult for QoS traffic to cope with sustaining transport congestion in case of facility impairment or failure.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one illustrative embodiment of the present invention, a method is provided for maintaining a quality of service (QoS) in a data transport network. The method comprises determining a first packet loss indication for a first flow of QoS traffic packets. The method further comprises determining a second packet loss indication for a second flow of QoS traffic packets, wherein the determination of the first packet loss indication for the first flow of QoS traffic packets is independent from the determination of the second packet loss indication for the second flow of QoS traffic packets. The method further comprises determining whether to drop the first flow of QoS traffic packets based on the first packet loss indication or to drop the second flow of QoS traffic packets based on the second packet loss indication.

In another illustrative embodiment of the present invention, an apparatus is provided for controlling congestion of a plurality of quality of service (QoS) flows in a data transport network. The apparatus comprises a detector disposed in a radio access network portion of the data transport network to detect congestion in a backhaul transport network portion of the data transport network. The detector determines a first packet loss indication for a first QoS flow independently from a second packet loss indication for a second QoS flow. The detector further determines whether to drop the first QoS flow based on the first packet loss indication or to drop the second QoS flow based on the second packet loss indication, wherein the backhaul transport network portion of the data transport network is a wireless backhaul network.

BRIEF DESCRIPTION OF THE DRAWINGS

The invention may be understood by reference to the following description taken in conjunction with the accompanying drawings, in which like reference numerals identify like elements, and in which.

Figure 1:
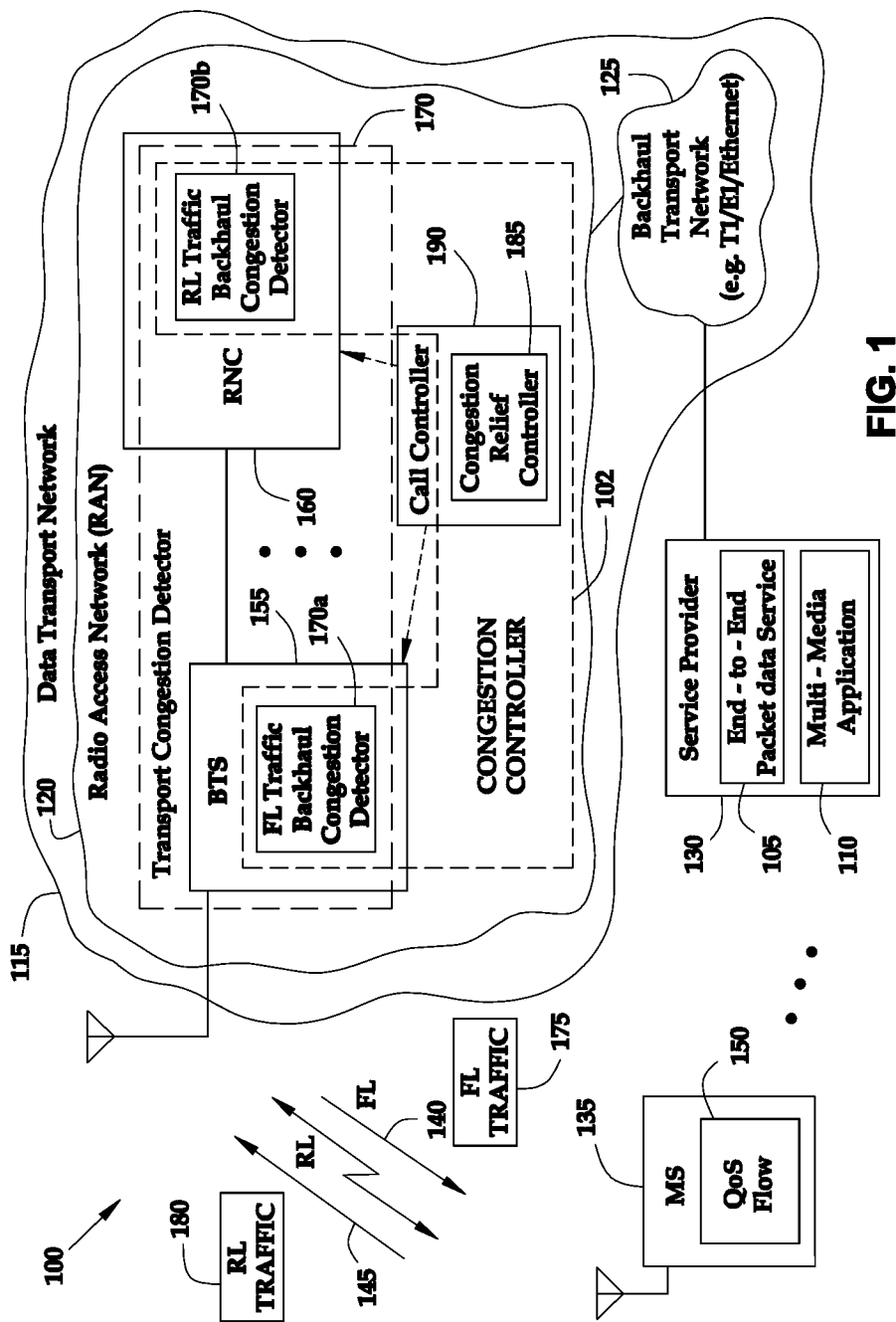
FIG. 1 schematically depicts a communication system in which a congestion controller may maintain a Quality of Service (QoS) of a packet data service or a multi-media application in a data transport network that includes an access network, such as a Radio Access Network (RAN) and a backhaul transport network according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method is provided for maintaining a Quality of Service (QoS) of a service, such as a packet data service or multi-media application in a data transport network including an access network, for example, a Radio Access Network (RAN). Unlike other congestion control mechanisms in which congestion in a transport network is detected via aggregate traffic performance measurement, such as aggregate traffic packet loss rate, a distributed congestion detection scheme without coordinating each QoS flow and selecting a particular one to drop therefrom is provided. In one embodiment, a method comprises determining a first packet loss indication for a first flow of QoS traffic packets independently from a second packet loss indication for a second flow of QoS traffic packets. The method further comprises determining whether to drop the first flow of QoS traffic packets based on the first packet loss indication or to drop the second flow of QoS traffic packets based on the second packet loss indication. An apparatus may control congestion of a plurality of quality of service (QoS) flows in a data transport network. For end users, such a congestion control may pace dropping of the QoS flows and since the dropping of a particular flow drop has a high-correlation with degradation in a desired QoS performance. To control congestion, the apparatus may comprise a detector disposed in a radio access network portion of the data transport network to detect congestion in a backhaul transport network portion of the data transport network. For example, the backhaul transport network portion of the data transport network may be a wireless backhaul network. A customer may control a congestion trigger as well as congestion relief rate, which are QoS aware. In this manner, the desired QoS performance of the transport network may be tailored to match a specific customer service and/or objective. By dropping one or more QoS flows with a worst impact on the desired QoS performance, a minimum number of QoS flows may be dropped to recover the transport network from congestion. In other words, using per-flow independent packet loss statistics to determine whether that flow should be dropped and gradually dropping such QoS flows having the most impact on a desired QoS performance, a reduced number of QoS flows may be dropped to recover a data transport network from congestion. For example, a central controller may regulate the independent flow drops due to congestion diction and reaction. By this regulation, in one embodiment, only a portion of the QoS flows may be dropped (e.g., based on their own performance) and a sufficient time may be left for other QoS flows to recover. This may prevent an "avalanche effect," in which all the QoS flows are dropped because they all suffer from backhaul congestion.

Referring to FIG. 1, a communication system 100 is illustrated in which a congestion controller 102 may maintain a Quality of Service (QoS) of a service or an application within a data transport network 115 according to one illustrative embodiment of the present invention. While examples of the service include a packet data service 105, one example of the application is a multi-media application 110. In one embodiment, to provide a service or an application to an end user, the data transport network 115 may include an access network, such as a Radio Access Network (RAN) 120 and a backhaul transport network 125. For example, a service provider 130 coupled to the backhaul transport network 125 may provide the packet data service 105 and/or the multi-media application 110 to an end user. While the packet data service 105 may be a packet-based an end-to-end service, the examples of the multi-media application 110 include digital media and entertainment applications that may deliver voice and/or data over the data transport network 115.

In the communication system 100, a mobile station (MS) 135 associated with an end user may wirelessly communicate with the service provider 130 over the Radio Access Network (RAN) 120 and the backhaul transport network 125 in accordance with one embodiment of the present invention. The Radio Access Network 120 may manage radio access resources including a forward link (FL) 140 radio frequency (RF) resource, a reverse link (RL) 145 RF resource, and resources of the backhaul transport network 125. For example, the backhaul transport network 125 may comprise backhaul facilities, such as a T1 line, E1 line and/or Ethernet, which may be expensive to provision. However, provision of a desired Quality of Service (QoS) support of an end-to-end packet data service, e.g., the packet data service 105 or the multi-media application 110 in the Radio Access Network 120 may depend upon the quality and reliability of the backhaul facilities including a T1 line, E1 line and/or Ethernet.

The Radio Access Network 120 may comprise a plurality of Base Transceiver Stations (BTSs) 155 (1-m) coupled to a Radio Network Controller (RNC) 160. To provide network access support on the Radio Access Network 120, each Base Transceiver Station 155 may be coupled to the service provider 130 via the backhaul transport network 125. For the purposes of providing a desired Quality of Service (QoS) support to an end user of an end-to-end packet data service, e.g., the packet data service 105, the congestion controller 102 may be distributed at the Base Transceiver Station 155 and the Radio Network Controller 160. In this way, the congestion controller 102 may control congestion of a plurality of QoS flows independently within the data transport network 115.

The congestion controller 102, in one illustrative embodiment, may comprise a transport congestion detector 170 disposed in the Radio Access Network 120 to independently control congestion of a QoS flow 150 of an end user at the mobile station 135. The transport congestion detector 170 may detect congestion in the backhaul transport network 125 of the data transport network 115. To detect the congestion in the backhaul transport network 125, the transport congestion detector 170 may comprise a first detector portion, i.e., a FL traffic backhaul congestion detector 170a disposed in the Base Transceiver Station 155 to detect backhaul congestion in forward link (FL) traffic 175 on the FL 140 to the mobile station 135. The transport congestion detector 170 may further comprise a second detector portion, i.e., a RL traffic backhaul congestion detector 170b disposed in to detect backhaul congestion in reverse link (RL) traffic 180 on the RL 145 from the mobile station 135 to the Base Transceiver Station 155.

Consistent with one embodiment, the congestion controller 102, as shown in FIG. 1, may comprise a congestion relief controller 185 disposed in a call controller 190. When the backhaul transport network 125 of the data transport network 115 is a wireless backhaul network, for example, the call controller 190 that may be executed at the Base Transceiver Station 155 and/or the Radio Network Controller 160.

In operation, the transport congestion detector 170 may determine a first packet loss indication for a first QoS flow, such as the QoS flow 150 independently from a second packet loss indication for a second QoS flow. The transport congestion detector 170 may determine whether to drop the first QoS flow based on the first packet loss indication or to drop the second QoS flow based on the second packet loss indication. The congestion relief controller 185 may trigger an indication of congestion relief. For triggering the indication of congestion relief, the congestion relief controller 185 may selectively terminate the at least one QoS flow of the first or second QoS flows. By dropping one or more QoS flows with a worst impact on the desired QoS performance instead of all the QoS flows, the congestion controller 102 may drop a least number of QoS flows desired to recover the data transport network 115 from congestion.

The service provider 130 may enable access to the multi-media application 110 and the packet data service 105 by exchanging messages with the mobile station 135 over the data transport network 115. For example, the service provider 130 may enable an integrated data access to a set of digital wireless services for a subscriber over the data transport network 115.

Consistent with one embodiment, the mobile station 135 may transmit messages to the data transport network 115 over the reverse link 145. In the communication system 100, a wireless communication between the Radio Access Network 120 and the mobile station 135 may occur over an air interface via a radio frequency (RF) medium that may use a code division multiple access (CDMA) protocol to support multiple users. The forward link 140 may provide messages including traffic packets and signaling messages to the mobile station 135.

The Radio Access Network 120 may provide the wireless connectivity to the mobile station 135 according to any desirable protocol. Examples of such a protocol include a Code Division Multiple Access (CDMA, cdma2000) protocol, an Evolved Data Optimized (EVDO, 1XEVDO) protocol, a Universal Mobile Telecommunication System (UMTS) protocol, a Global System for Mobile communications (GSM) protocol, and the like.

Examples of the mobile station 135 may include a host of wireless communication devices including, but not limited to, cellular telephones, personal digital assistants (PDAs), and global positioning systems (GPS) that employ the communication system 100 to operate in the data transport network 115, such as a cellular or mobile data network. Other examples of the mobile station 135 may include smart phones, text messaging devices, and the like. The mobile station 135 may encompass additional features and applications than typically available on a conventional cellular phone. Examples of different features and applications include e-mail service, Internet access, audio-video interfaces for music and media content streaming.

Figure 2:
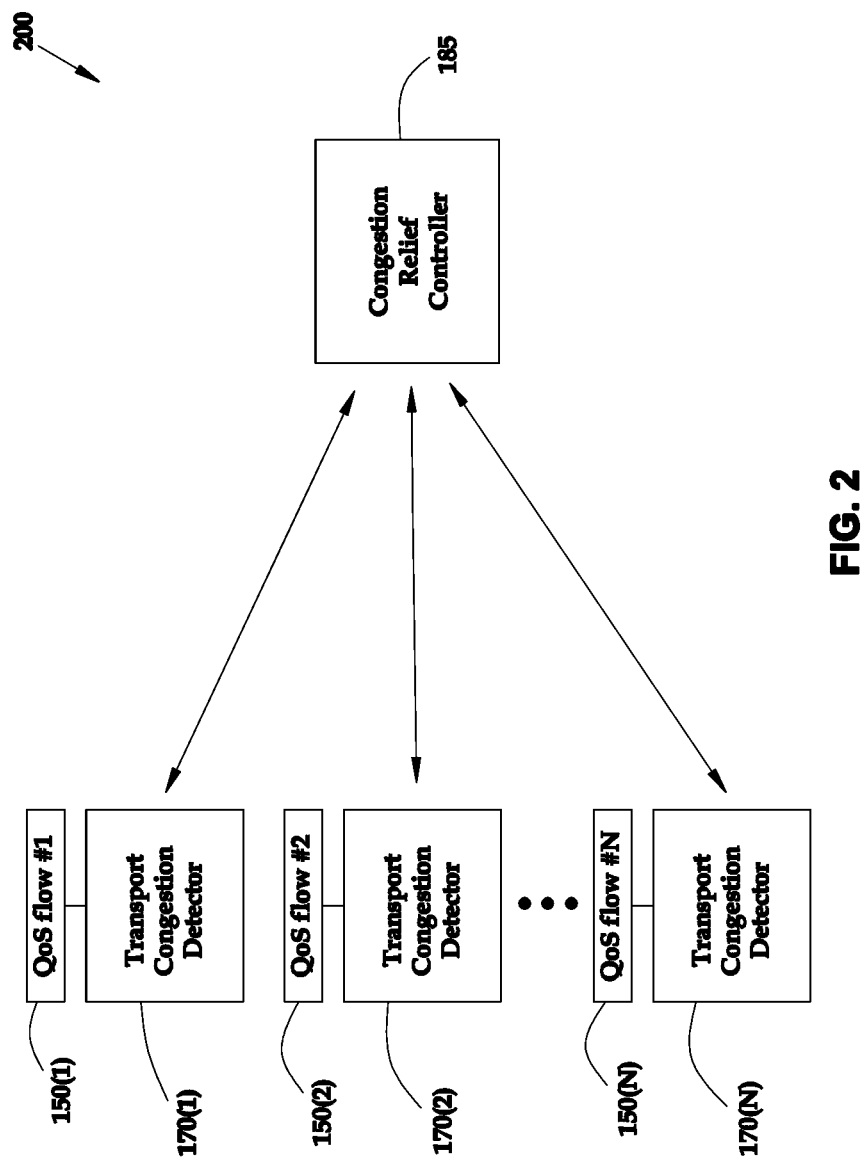
FIG. 2 illustrates a stylized representation of a congestion control platform that distributes a congestion detector in the data transport network shown in FIG. 1 for use with a centralized congestion relief controller according to one illustrative embodiment of the present invention.

Referring to FIG. 2, a stylized representation of a congestion control platform 200 that distributes the congestion detector 102 in the data transport network 115 shown in FIG. 1 for use with a centralized congestion relief, i.e., the congestion relief controller 185 is depicted to control congestion in the backhaul transport network 125 according to one illustrative embodiment of the present invention. Based on the congestion control platform 200, the congestion detector 102 may be distributed in a receiving end of the data transport network 115, such as within the Radio Access Network 120. By distributing the congestion detector 102 based on the congestion control platform 200, the service provider 130 may maintain a desired QoS of a packet-based end-to-end service, the packet data service 105 in the data transport network 115. For example, the congestion control platform 200 may enable the congestion detector 102 to detect congestion in the backhaul transport network 125 of the data transport network 115.

A first transport congestion detector portion 170(1) may monitor a first packet loss rate in a first flow of QoS traffic packets 150(1) independently from a second transport congestion detector portion 170(2) that monitors a second packet loss rate in a second flow of QoS traffic packets 150(2). For an independent monitoring of the packet loss rates, the congestion detector 102 may cause each flow of QoS traffic packets 150 of the first and second flows of QoS traffic packets 150 (1,2) to individually detect an indication of transport congestion at a packet-level. To this end, each flow of QoS traffic packets of the plurality of flows of QoS traffic packets 150(1-N) may evaluate a packet drop statistic over a time period. In response to an indication of degradation of performance in an application, such as the multi-media application 110 based on the indication of transport congestion at a packet-level and the packet drop statistic, a particular flow of QoS traffic packets of the first and second flows of QoS traffic packets 150(1,2) may independently trigger a request for terminating that flow of QoS traffic packets.

The congestion detector 102 may determine whether the data transport network 115 experiences congestion based on the first and second packet loss rates to selectively terminate at least one flow of QoS traffic packets of the first or second flows of QoS traffic packets 150(1,2). In particular, for determining whether the data transport network 115 experiences congestion, the congestion detector 102 may compare the first and second packet loss rates to a threshold associated with at least two consecutive evaluation widows. For example, to compare the first and second packet loss rates to a threshold, the congestion detector 102 may use a non-overlapping packet-based window of a given number of expected packets to optimize the first and second packet loss rates. If the first or second packet loss rates exceeds the threshold, the congestion detector 102 selectively terminates at least one flow of QoS traffic packets of the first or second flows of QoS traffic packets 150(1,2).

When the data transport network 115 experiences congestion, the congestion relief controller 185 may control a dropping rate of flow of QoS traffic packets for the first or second flows of QoS traffic packets 150(1,2) within a given time period across one or more packet windows. To control the dropping rate of flow of QoS traffic packets, the congestion relief controller 185 may trigger an indication of congestion relief by selectively terminating the first or second flows of QoS traffic packets 150(1,2). For controlling a rate of flow drops of the first or second flows of QoS traffic packets 150(1,2), the congestion relief controller 185 may relieve the congestion gradually by dropping a minimum number of flows of the plurality of flows of QoS traffic packets 150(1-N) to recover from the congestion in the data transport network 115.

According to one illustrative embodiment of the present invention, the congestion relief controller 185 may determine whether a particular flow of QoS traffic packets of the first and second flows of QoS traffic packets 150(1,2) requests dropping. The congestion relief controller 185 may then determine whether the dropping of the particular flow of QoS traffic packets is rejected. If the particular flow of QoS traffic packets requests dropping but flow dropping is rejected, the congestion relief controller 185 may evaluate a packet drop rate for the particular flow of QoS traffic packets in a next packet window. If a drop trigger for the particular flow of QoS traffic packets persists, the congestion relief controller 185 may cause the particular flow of QoS traffic packets to automatically request dropping again. In this way, the congestion relief controller 185 may provide an opportunity to recover and re-evaluate a flow trigger to the remaining flows of the first and second flows of QoS traffic packets 150(1,2).

Figure 3:
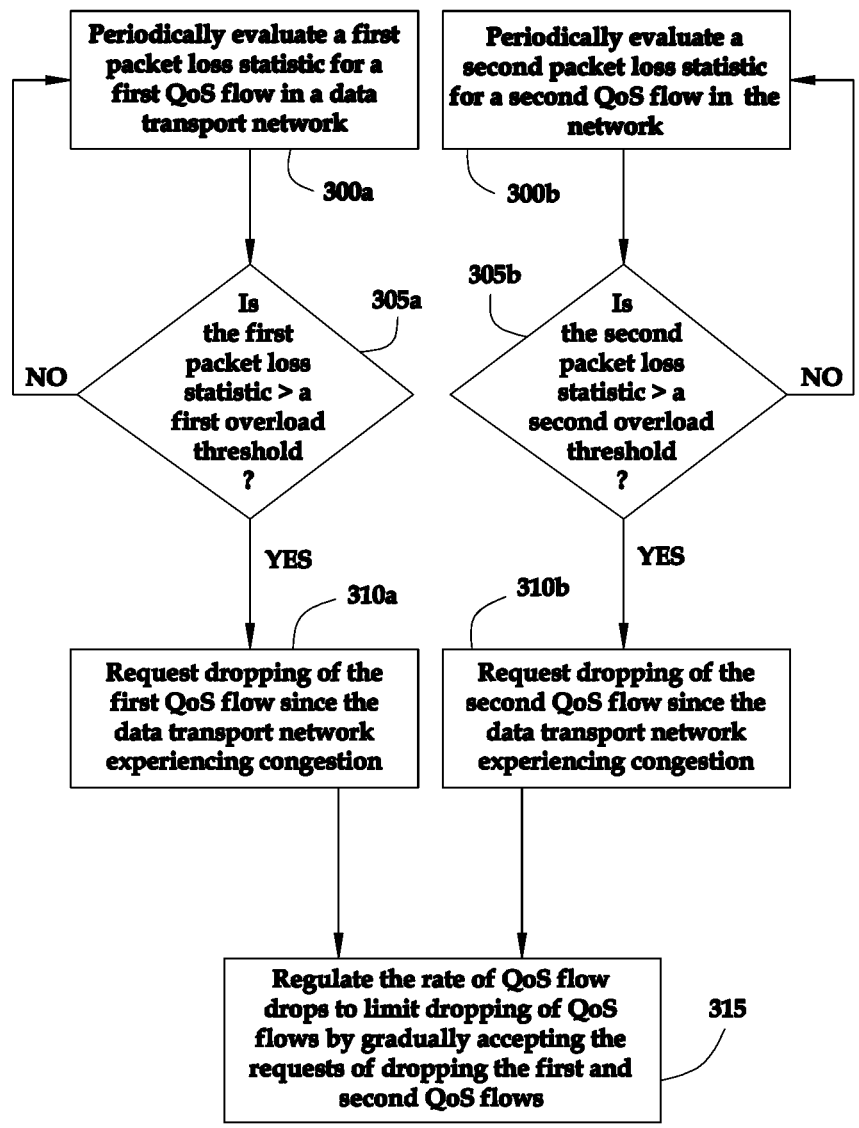
FIG. 3 depicts a stylized representation for implementing a method for maintaining the QoS in the data transport network by controlling congestion of a plurality of QoS flows using the congestion control platform shown in FIG. 2 consistent with one exemplary embodiment of the present invention.

Turning to FIG. 3, consistent with one exemplary embodiment of the present invention, a stylized representation for implementing a method of maintaining the QoS in the data transport network 115 by controlling congestion of the plurality of QoS flows 150(1-N) using the congestion control platform 200 shown in FIG. 2 is depicted. According to one exemplary embodiment of the present invention, the first transport congestion detector portion 170(1) may periodically evaluate a first packet loss statistic, such as a packet drop or loss rate in the first flow of QoS traffic packets 150(1) within the data transport network 115, as indicated at block 300a. Likewise, at block 300b, the second transport congestion detector portion 170(2) periodically evaluates a second packet loss statistic in the second flow of QoS traffic packets 150(2) independently from the first flow of QoS traffic packets 150(1).

At a decision block 305a, the first transport congestion detector portion 170(1) may compare the first packet loss statistic to a first overload threshold independently from comparing of the second packet loss indication to a second overload threshold, at another decision block 305b. In response to determining that the first packet loss statistic exceeds the first overload threshold, at block 310a, the first transport congestion detector portion 170(1) may issue a first request for dropping the first flow of QoS traffic packets 150(1) since the data transport network 115 may be experiencing congestion. Likewise, if the second transport congestion detector portion 170(2) at the decision block 305b determines that the second packet loss indication exceeds the second overload threshold, a second request for dropping the second flow of QoS traffic packets 150(2) may be issued, at block 310b.

In this way, the congestion detector 102 may enable each individual QoS flow 150 to detect the transport congestion independently by monitoring a packet-level performance. For example, each QoS flow 150 may evaluate its own packet loss/drop statistics along with the time, and use the packet loss rate as the metric to determine whether the data transport network 115 experiences congestions. Consistent with one embodiment, for the plurality of QoS flows 150(1-N) having a rigid latency requirement, a packet with excessive delay may also be regarded as a lost packet in the measurement of the packet loss rate. However, the packet loss rate may be optimized to fit a specific network. The following is an exemplary implementation of determining the packet loss rate:

$$PLR(n) = \frac{\text{N\_Lost\_Pkts}((n-1)K, nK)}{K},$$

where n is the index of a non-overlapping window of K expected packets. Because the packet inter-arrivals depend on the traffic characteristics and transport performance, using a packet-based window is more robust than a time-based window in one embodiment of the present invention.

When the detected packet loss rate of a QoS flow 105 exceeds a triggering threshold for consecutive evaluation windows, a sustaining congestion may cause a significant application performance degradation. This condition may thus trigger a flow termination request to alleviate the congestion. The triggering threshold and the number of windows may both be determined based on the QoS requirements of the QoS flow, hence the trigger may also be QoS-aware.

At block 315, the congestion relief controller 185 may selectively terminate at least one of the first or second flows of QoS traffic packets 150(1,2) based on the first and second requests for dropping flow. In other words, the congestion relief controller 185 may regulate the rate of QoS flow drops to limit dropping of QoS flows by gradually accepting or granting the requests of dropping the first and second QoS flows. By using the transport congestion detector 170 to provide the distributed congestion control along with a centralized congestion relief based on the congestion relief controller 185, the congestion controller 102 may cause the QoS traffic to cope with sustaining transport congestion due to facility impairment or failure cases, in some embodiments of the present invention. Thus, the congestion controller 102 may maintain an optimal overall performance for the aggregate QoS traffic when transport congestion happens.

For example, during sustaining network congestion, many QoS flows 150 may be impacted and hence multiple flow drop requests may be triggered in a short period of time. However, all the flow drop requests may not be granted immediately to relieve a congestion condition. The congestion relief controller 185 may enable a centralized pacing mechanism to control a rate of flow drops so that the congestion is gradually relieved and the remaining flows get the opportunity to recover and re-evaluate a flow trigger. If a QoS flow requests dropping but is rejected by the centralized pacing mechanism, the traffic continues as well as the packet drop rate evaluation in its next packet window. If a flow drop trigger persists, however, the QoS flow may automatically request dropping again. Although if the packet loss condition improves, this QoS flow may no longer request dropping. This QoS flow is thus saved from being dropped.

Accordingly, even if the congestion sustains, all the traffic carried on the backhaul transport network 125 may not be impacted and the performance of the multi-media application 110 may not significantly degrade. Such a distributed congestion control for QoS traffic may maximize the probability that a desired QoS performance being maintained in the data transport network 115.

In one embodiment, by using of the congestion control platform 200, a high-speed wireless data network may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
measuring a first packet loss rate of a first flow of quality-of-service (QoS) packets over a backhaul transport network between a first base transceiver station and a radio network controller;
measuring a second packet loss rate of a second flow of QoS packets over the backhaul transport network between a second base transceiver station and the radio network controller;
selectively dropping the first flow or the second flow based on a first comparison of the first packet loss rate to a first threshold that is determined based on a first QoS requirement for the first flow and a second comparison of the second packet loss rate to a second threshold that is determined based on a second QoS requirement for the second flow,
receiving a request to drop at least one of the first or second flow;
rejecting the requested drop of the at least one of the first flow or the second flow; and
causing, in response to the first packet loss rate or the second packet loss rate exceeding a corresponding threshold in a next packet window, the at least one of the first flow or the second flow to request dropping of the at least one of the first flow or the second flow after a previously requested drop was rejected.

2. The method of claim 1, wherein selectively dropping the first flow or the second flow comprises selectively dropping the first flow or the second flow that has the worst impact on QoS performance.

3. The method of claim 1, wherein measuring the first packet loss rate of the first flow and the second packet loss rate of the second flow comprises independently measuring the first packet loss rate of the first flow and the second packet loss rate of the second flow using first and second transport congestion detector portions, respectively.

4. The method of claim 1 wherein selectively dropping the first flow or the second flow comprises dropping a minimum number of flows to recover from congestion in the backhaul transport network.

5. An apparatus. comprising:
a first transport congestion detector to measure a first packet loss rate o a first flow of quality-of-service (QoS) packets over a backhaul transport network between a first ase transceiver station and a radio network controller;
a second transport congestion detector to measure a second packet loss rate of a second flow of QoS packets over the backhaul transport network between a second base transceiver station and the radio network controller, wherein the first and second packet loss rates are determined using only respective numbers of packets lost in the backhaul transport network from corresponding packet windows that each have a predetermined number of packets; and
a congestion controller to selectively drop the first flow or t. e second flow base on a first comparison of the first packet loss rate to a first threshold that is determined based on a first QoS requirement for the first flow and. a second comparison of the second packet loss rate to a second threshold that is determined based on a second QoS requirement for the second flow, wherein the congestion controller is to receive a request to drop at least one of the first flow or the second flow, and wherein the congestion controller is to reject the requested drop of the at least one of the first flow or the second flow, and wherein the congestion controller is to cause, in response to the first packet loss rate or the second packet loss rate exceeding a corresponding threshold in a next packet window, the at least one of the first flow or the second flow to request dropping of the at least one of the first flow or the second flow after a previously requested drop was rejected.

6. The method of claim 1, wherein selectively dropping the first flow or the second flow comprises issuing a first request to drop the first flow in response to the first packet loss rate exceeding the first threshold.

7. The method of claim 1, wherein selectively dropping the first flow or the second flow comprises issuing a second request to drop the second flow in response to the second packet loss rate exceeding the second threshold.

8. The method of claim 1, wherein the first and second packet loss rates are measured only for respective numbers of packets lost in the backhaul transport network from corresponding packet windows that each have a predetermined number of packets.

9. The apparatus of claim 5, wherein the congestion controller is to selectively drop the first flow or the second flow that has the worst impact on QoS performance.

10. The apparatus of claim 5, wherein the first transport congestion detector and the second transport congestion detector independently measure the first packet loss rate of the first flow and the second packet loss rate of the second flow, respectively.

11. The apparatus of claim 5, wherein the congestion controller is to selectively drop a minimum number of flows to recover from congestion in the backhaul transport network.

12. The apparatus of claim 5, further comprising:
a congestion detector to issue a first request to drop the first flow in response to the first packet loss rate exceeding the first threshold.

13. The apparatus of claim 5, wherein the congestion detector is to issue a second request to drop the second flow in response to the second packet loss rate exceeding the second threshold.

14. The apparatus of claim 5, wherein the first and second transport congestion detectors measure the first and second packet loss rates only for respective numbers of packets lost in the backhaul transport network from corresponding packet windows that each have a predetermined number of packets.

\* \* \* \* \*